April 22, 1969 D. M. WEITZNER ET AL 3,439,598

CAMERA AND SOUND RECORDING DEVICE

Filed May 25, 1966 Sheet 1 of 7

INVENTORS
DOROTHEA M. WEITZNER &
LAFOREST S. SAULSBURY
BY Polachek & Saulsbury
ATTORNEYS April 22, 1969 D. M. WEITZNER ET AL 3,439,598

CAMERA AND SOUND RECORDING DEVICE

Filed May 25, 1966 Sheet 2 of 7

INVENTORS

DOROTHEA M. WEITZNER &
LAFOREST S. SAULSBURY

BY Polachek & Saulsbury

ATTORNEYS

INVENTORS
DOROTHEA M. WEITZNER &
LAFOREST S. SAULSBURY
BY Polachek & Saulsbury
ATTORNEYS INVENTORS
DOROTHEA M. WEITZNER &
LAFOREST S. SAULSBURY
BY Polachek & Saulsbury
ATTORNEYS April 22, 1969 D. M. WEITZNER ET AL 3,439,598

CAMERA AND SOUND RECORDING DEVICE

Filed May 25, 1966 Sheet 5 of 7

INVENTORS

DOROTHEA M. WEITZNER &
LAFOREST S. SAULSBURY

BY Polachek & Saulsbury

ATTORNEYS

INVENTORS
DOROTHEA M. WEITZNER &
LAFOREST S. SAULSBURY
BY
Polachek & Saulsbury
ATTORNEYS INVENTORS
DOROTHEA M. WEITZNER &
LAFOREST S. SAULSBURY
BY Polachek & Saulsbury
ATTORNEYS United States Patent Office 3,439,598
Patented Apr. 22, 1969

3,439,598

CAMERA AND SOUND RECORDING DEVICE

Dorothea M. Weitzner, 8 E. 62nd St., New York, N.Y. 10021, and Laforest S. Saulsbury, New York, N.Y.; said Saulsbury assignor to said Weitzner Filed May 25, 1966, Ser. No. 552,902
Int. Cl. G03b *31/04*
U.S. Cl. 95—12 8 Claims

ABSTRACT OF THE DISCLOSURE

A camera having a sound recording device attached thereto including a rotating photograph record head recording an audio message on the backing of the film in the camera, and means for audibly playing back the audio message recorded on the film backing. The camera is used for making frames slides with audio messages inscribed on the frames of the slides. The camera has a casing for removably receiving a cartridge with a laminated film assembly therein to photographically record optical images. A casing structure is associated with the casing supporting a rotatable disk and motor means for rotating said disk. A sound recording head is mounted on the disk and carries a stylus for contacting a film layer in the laminated film assembly, and means for moving the sounding recording head radially of the disk while the disk rotates for tracing a spiral path on the film layer.

This invention concerns a camera adapted for photographing still pictures on film and provided with means for recording audible messages corresponding to the pictures on a medium associated with the film.

One object of the invention is to provide a camera in which a rotating phonograph recording head records an audio message on the backing of film in the camera.

Still another object is to provide a camera as described with means for audibly playing back the audio message recorded on the film backing.

A further object is to provide a camera adapted for use in making framed slides with audio messages inscribed on the frames of the slides.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figures 1, 2:
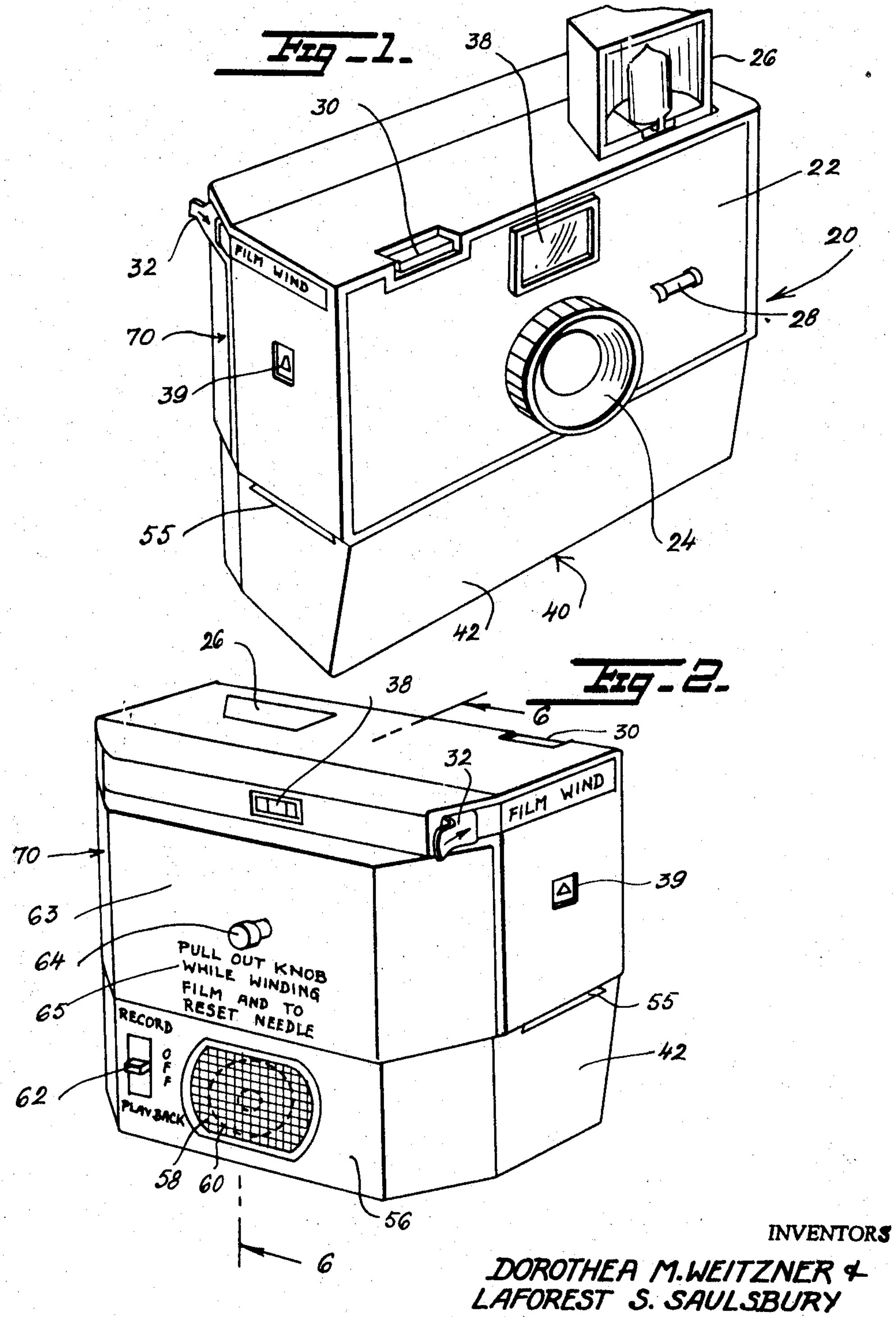
FIGURE 1 is a perspective front, top and side view of a camera embodying the invention.
FIG. 2 is a perspective rear top and side view of the camera.

Referring first to FIGS. 1–4, there is shown a camera 20 comprising an upper forward section 22 having a lens assembly 24 mounted at the front. A flashlight cartridge 26 is slidably mounted in the top of section 22 and is released for upward extension by a spring operated by pushbutton 28. A snap button 30 at the front of the camera is used to actuate a shutter for snapping a picture. A lever 32 is provided at the side of the camera for advancing photographic roll film 33 in a cartridge 34 by moving arm 35. Inside section 22 is a tapered optical guide 36 which extends from the front of the camera to the cartridge. At the top of section 22 is an optical sighting lens assembly 38. To the extent described, the camera is conventional, and generally similar to a camera known as the "Instamatic" manufactured by Eastman Kodak of Rochester, N.Y.

Now according to the invention, the camera is modified by addition of casing structure 40 which is applied to the back and bottom of section 22 behind and underneath the cartridge 34. In this casing structure is the acoustic recording and playback assembly to which the invention primarily is directed. The casing is hinged at one side and is held closed by latch 39 engaging spring 41 in section 22.

Figures 3, 18:
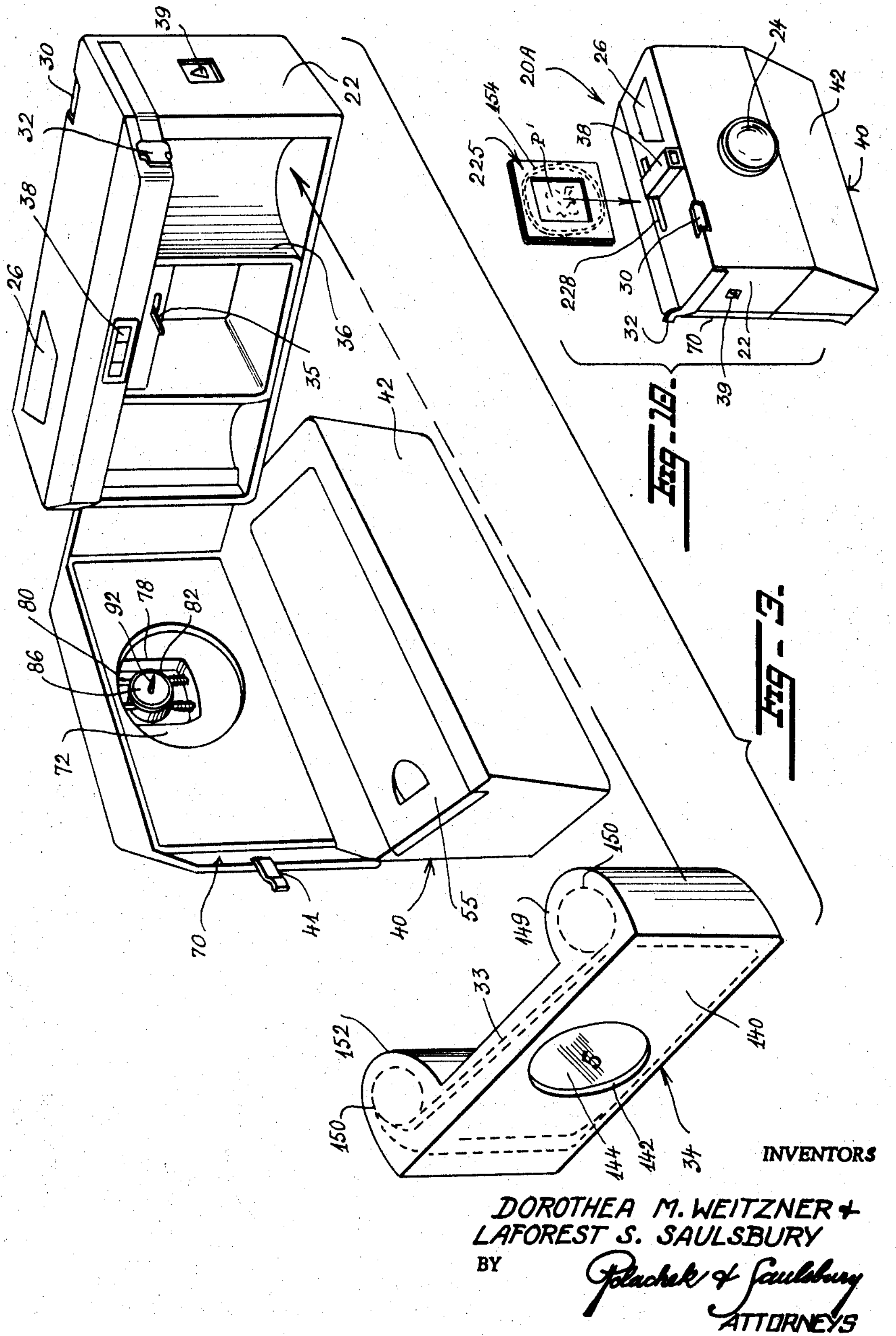
FIG. 3 is an exploded perspective view of parts of the camera.
FIG. 18 is a reduced perspective view of another camera adapted for playing back an audio message recorded on a slide.
Figure 4:
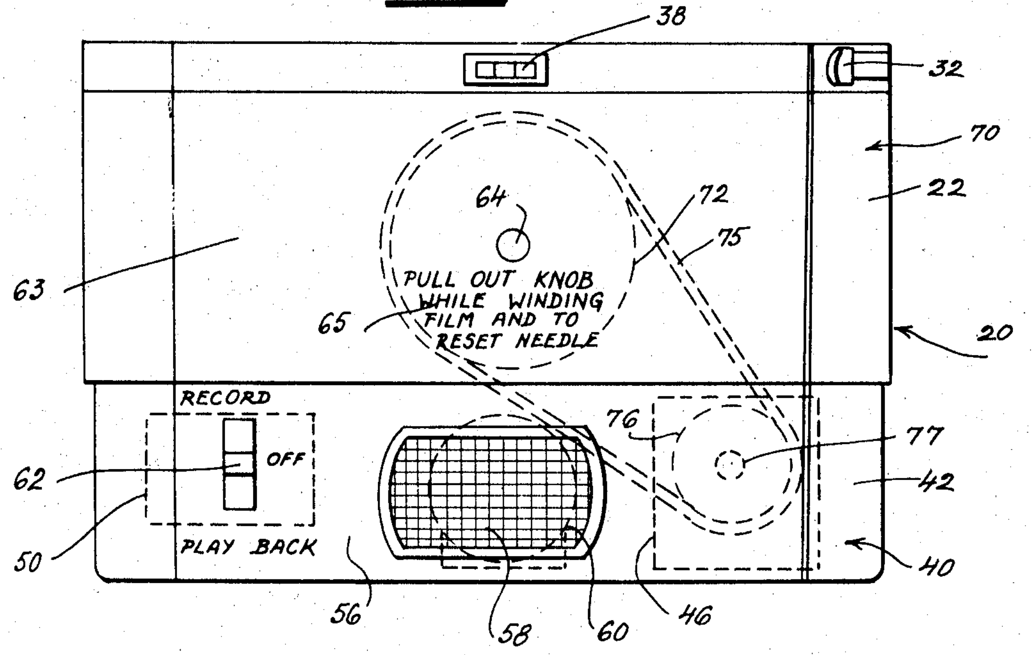
FIG. 4 is an enlarged rear view of the camera.
Figure 5:
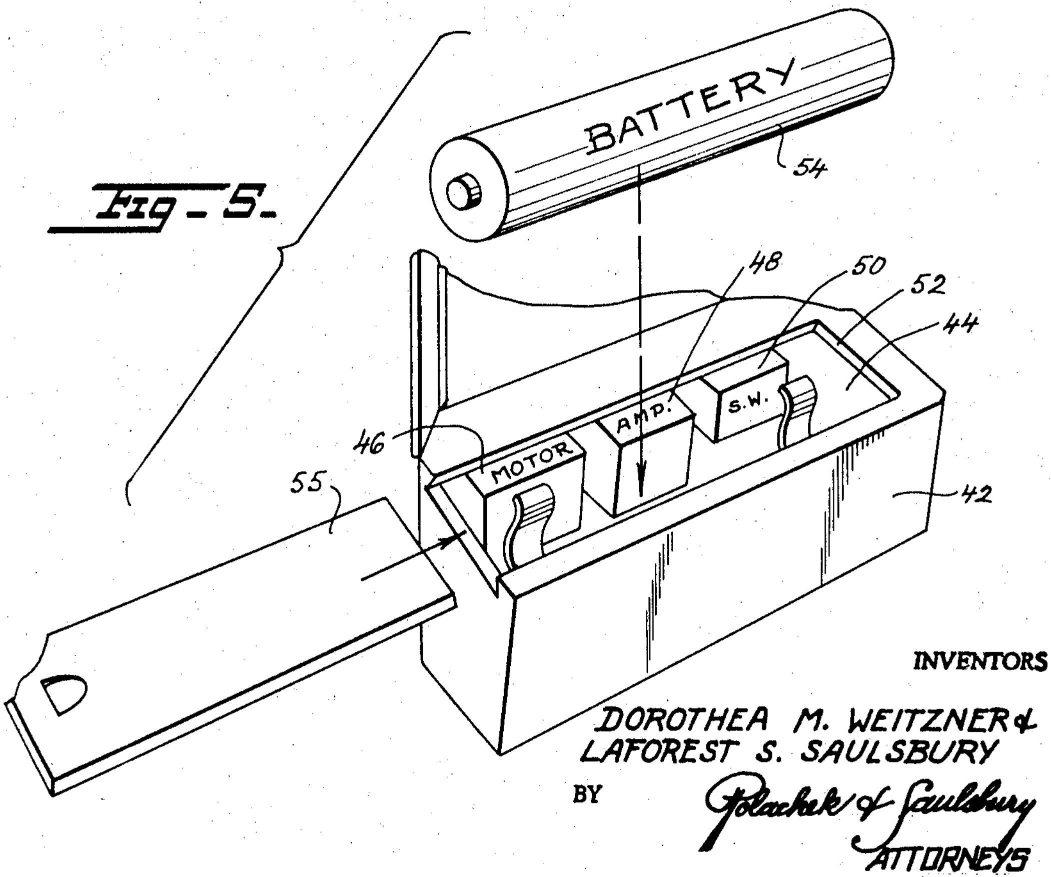
FIG. 5 is an exploded view of parts of the sound recording apparatus of the camera.
Figure 6:
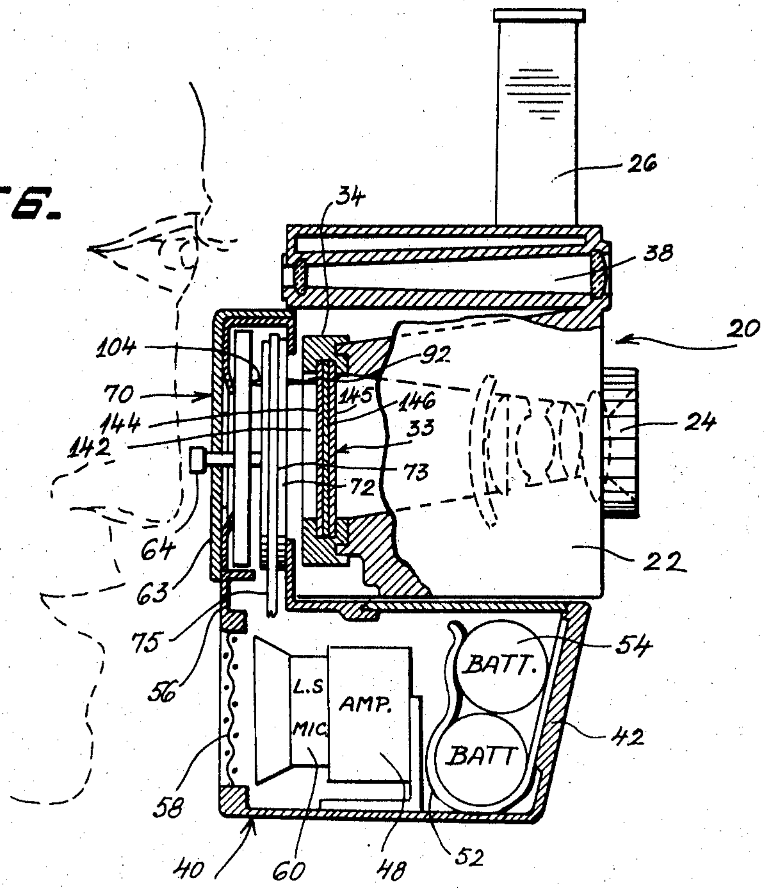
FIG. 6 is a vertical sectional view taken on line 6—6 of FIG. 2.

Casing structure 40 is best shown in FIGS. 2–6 and 9–12 to which reference is now made. The casing structure is generally L-shaped in vertical section as clearly shown in FIG. 6. In the bottom or base 42 of the casing structure is a compartment 44 in which is an electric motor 46, transistor amplifier 48, switch 50 and spring clips 52 for holding batteries 54, as shown in FIGS. 5 and 6. A cover 55 can be slidably mounted on the forward position of the base.

At the back wall 56 of the base is a mesh screen 58; see FIGS. 2 and 4. Forward of the screen is a loudspeaker-microphone unit 60 connected in circuit with the amplifier and switch as is explained more fully below. A slidable button 62 of the switch 50 projects rearwardly of the back wall 56. This switch has three positions, an upper RECORD position, a center OFF position, and a lower PLAYBACK position. Located above the screen 58 and projecting rearwardly from casing wall 63 is a knob 64 with operating instruction indicia 65 located below the knob on wall 63.

The casing structure 40 has section 70 extending upwardly from the base 42 and located at the back of camera section 22. In section 70 is a rotatable disk 72 mounted on an axial shaft 74 extending rearwardly of the disk; see FIGS. 3, 4, 6, 8–10. This disk has a peripheral groove 73 in which is engaged an endless belt 75 entrained on a pulley 76 driven by shaft 77 of motor 46.

Disk 72 has an elongated wide radial opening 78 in which are two parallel rods or bars 80 extending generally parallel to a central radial plane of symmetry of opening 78. A cylindrical recording and playback head 82 is slidably carried by the bars 80.

Figures 9, 10, 11, 12:
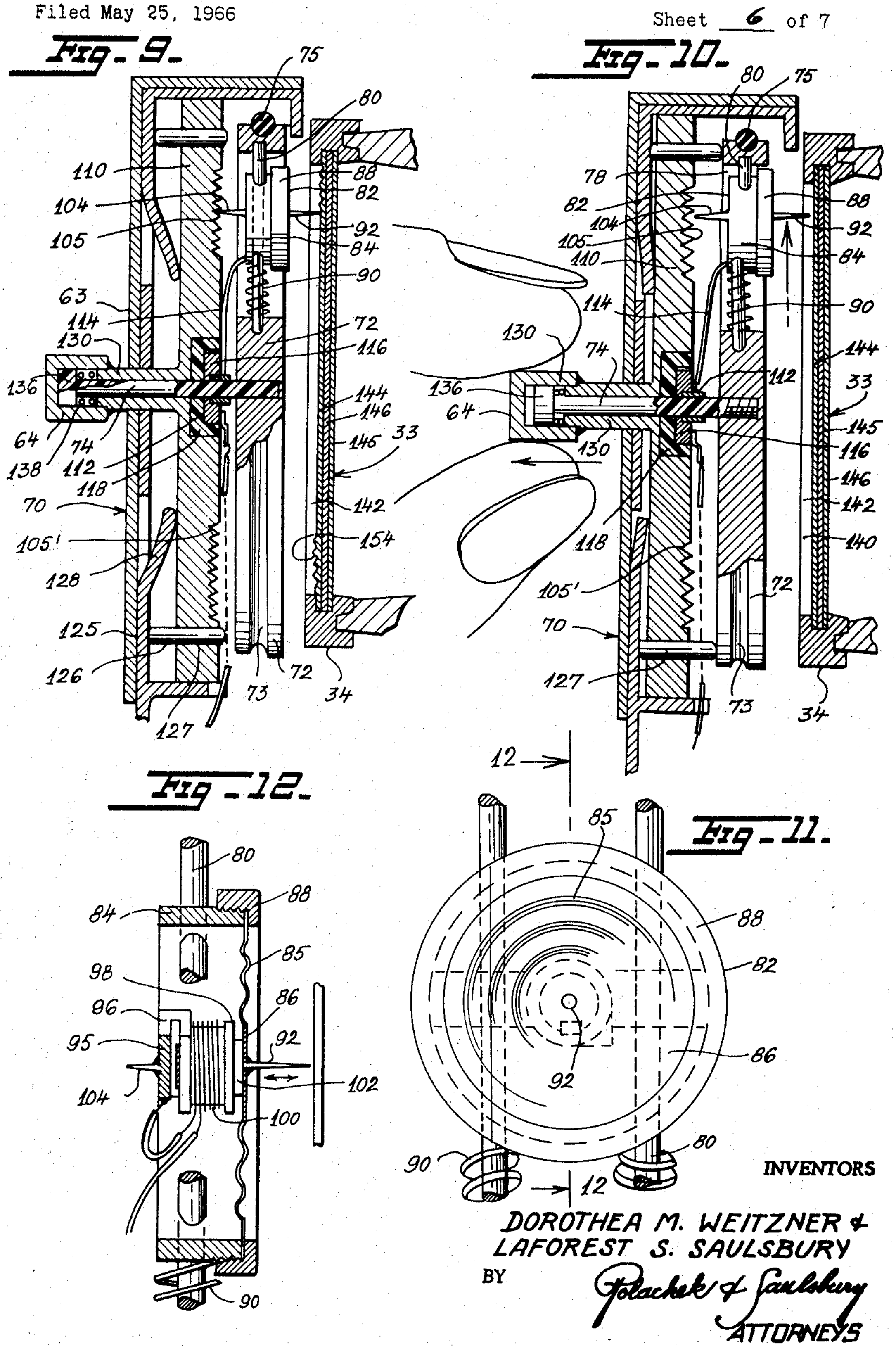
FIG. 9 is a sectional view taken on line 9—9 of FIG. 8, with the parts shown in operation, assembled position.
FIG. 10 is a section view similar to FIG. 9, showing parts of the assembly in another operating position.
FIG. 11 is a fragmentary enlarged front view of an audio recording head with associated parts of the apparatus.
FIG. 12 is a further enlarged sectional view taken on line 12—12 of FIG. 11.

Head 82 as best shown in FIGS. 11 and 12 has a cylindrical axially horizontal wall 84 open at the back. The open front of the head is closed by a circular diaphragm 86 secured peripherally to the front edge of wall 84 by a threaded ring 88. The diaphragm is formed with concentric corrugations 85 to increase its flexibility. The bars extend through aligned openings formed in upper and lower sides of wall 84. A pair of coil springs 90 on bars 80 support the head 82 and tend to urge it upward. A pointed stylus 92 extends forwardly at the center of the diaphragm and is secured thereto. A rigid cross bar or plate 95 extends diametrally across inside wall 84 and carries a bracket 96 to which is secured an electromechanical transducer. The transducer includes a cylindrical coil form 98. A multiturn coil 100 is wound around the coil form. Slidably disposed inside the coil form and disposed axially horizontal is a soft iron plunger 102 which is attached at its front end to the back of the diaphragm 86 at its center for driving the diaphragm and reciprocating the stylus. A metal finger 104 is secured to and extends rearwardly of metal plate 95. This finger engages in a spiral groove 105 formed in the forward face of a metal plate 110. One end of coil 100 is connected to plate 95.

Plate 110 is rectangular. It has a central opening through which extends shaft 74. Shaft 74 is made of electrical insulation material and is secured embedded at its front end in disk 72. On shaft 74 is a metal slip ring 112 to which is connected by wire 114 to the other end of coil 100. Ring 112 slidably contacts a stationary metal ring 116 mounted in a cup shaped insulator 118 seated in a recess 120 in the front of plate 110. A wire 122 is connected to ring 116.

Plate 110 is slidable inside of a frame plate 125 located in casing section 70. Guide posts 126 extend horizontally from vertical plate 125 and through spaced holes 127 in plate 110. Plate 125 is formed with forwardly extending struck out spring fingers 128. Plate 110 bears against these fingers while finger 104 engages slidably in groove 105. A hollow shaft 130 integral with plate 110 extends rearwardly through registering openings in plate 125 and the back wall 63 of section 70. Hollow knob 64 is secured on the outer end of shaft 130. A head 136 is secured on the outer end of shaft 74. A small coil spring 138 is surrounding shaft 74 between the head 136 and annular rear end of shaft 130. This spring tends to draw the disk 72 and plate 110 together to insure that finger 104 remains engaged in groove 105.

If knob 64 is pulled outwardly of section 70, spring 138 will first be slightly compressed to retract disk 72 slightly and further outward movement of the knob will then cause the plate 110 to move back to plate 125 compressing spring fingers 128 while disk 72 is stopped at the forward ends of guide posts 126. The purpose of this arrangement and action will be explained with respect to the film cartridge and recording medium shown in FIGS. 3, 6, 9, 10 and 13 to which reference is now made.

The cartridge 34 has a rigid back wall 140 in which is a circular opening 142 (see FIG. 3). Exposed at this opening is a pliant impressionable transparent backing film on sheet 144. Film 144 is part of laminated film assembly 33 including a photographic emulsion coated film 145, an opaque intermediate sheet or strip 146 and finally backing film 144 (see FIG. 13). The laminated assembly is wound on a supply reel 148 in the cartridge 34 located in forwardly extending compartment 149, and is taken up on takeup reel 150 in compartment 152 of the cartridge. Lever 32 advances the laminated film assembly 33 in the direction of its length transversely of the camera and of the cartridge, by means of lever arm 35.

Film 144 serves as a sound recording medium. A spiral track 154 is impressed on the rear side of the recording film 144 by stylus 92. This track varies in depth in film 144 depending on the forward thrust of stylus 92 by plunger 102 when coil 100 is energized.

Figure 7:
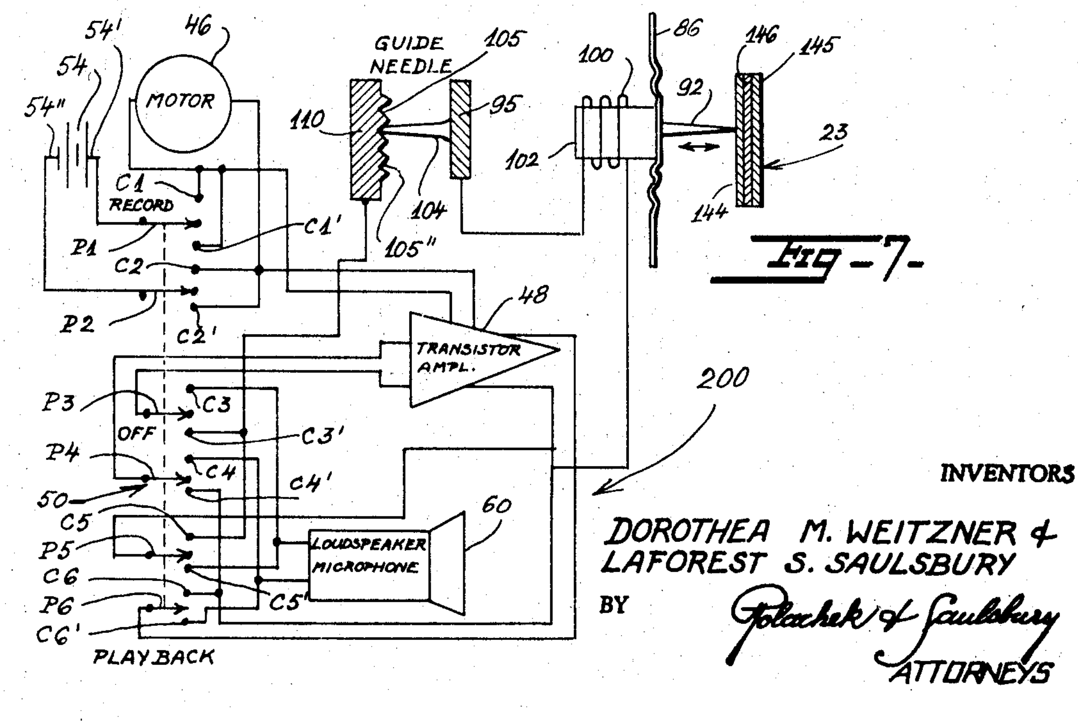
FIG. 7 is a diagram of an electric circuit employed in the camera.
Figure 8:
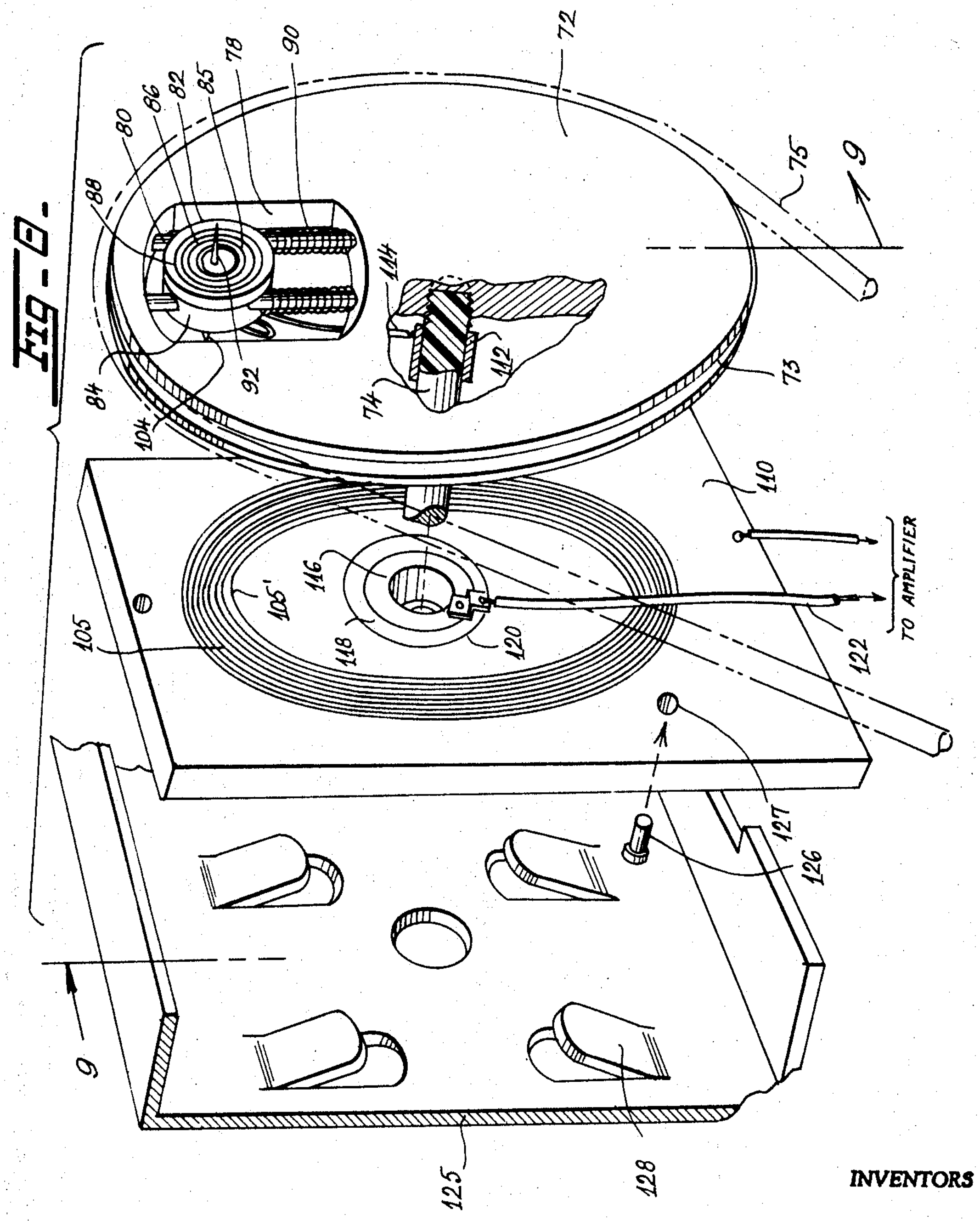
FIG. 8 is an enlarged exploded view of parts of the recording apparatus, portions being broken away.

Coil 100 is energized by means of the circuit 200 shown in FIG. 7 to which reference is now made. This circuit has batteries 54 connected in circuit with switch 50. Switch 50 is a six-pole three position switch. All center contacts 201 at the center OFF position of the switch are open circuited. Poles P1–P6 each are movable between upper contacts C1–C6 respectively at the RECORD position and lower contacts C1′–C6′ at the PLAYBACK position of the switch.

Pole P1 and pole P2 are connected to opposite terminals 54′ and 54″ of batteries 54. Poles P3 and P4 are connected to input terminals of transistor amplifier 48. Poles P5 and P6 are connected to the output terminals of amplifier 48.

Contacts C1 and C1′ are connected together to one terminal of motor 46 and one power supply input terminal of amplifier 48. Contacts C2 and C2′ are connected together to the other terminal of motor 46 and the other power supply input terminal of the amplifier. Contacts C3 and C5′ are connected to one terminal of the loudspeaker-microphone 60. Contacts C3′ and C5 are connected to plate 110. Finger 104 on plate engages in groove 105 of plate 110. One end of coil 100 is connected to plate 95. The other end of coil 100 is connected to contacts C4′ and C6. Contacts C4 and C6′ are connected to the other terminal of the loudspeaker-microphone 60.

In operation of the camera 20 including the circuit 200, the film assembly 33 will be set by finger 32 for exposing film 145 at any desired position in alignment with the lens assembly 24. Normally the stylus 92 will be lightly pressed against audio recording film 144. To prevent stylus from scratching the film 144 while the film assembly 33 is advanced, knob 64 will be pulled outwardly as indicated by instructions 65. This will initially cause the disk 72 to be retracted slightly so that the stylus clears the groove 154 in film 144 and the film assembly 33 can then be safely advanced to the next unexposed position. As the knob 64 is pulled out further, plate 110 is retracted against spring fingers 128 while disk 72 is stopped by stationary fingers 126. This disengages the finger 104 from groove 105 and head 82 is then released and can be pushed up automatically by expanding springs 90 on bars 80. This restores the head 82 to initial recording position. The film assembly 33 is then advanced and knob 64 is released and the camera is now ready for snapping a picture and recording an audio message. First the photographer snaps a picture by pressing button 30, with the flashlight assembly 26 either elevated or lowered depending on the picture requirements. Now the apparatus is ready for recording an audio message. The photographer sets switch 50 to RECORD position.

With switch 50 in RECORD position, the terminals of the loudspeaker-microphone 60 are connected to the input of the amplifier and the output of the amplifier is connected to coil 100. Motor 46 is energized and rotates disk 72. The amplifier 48 is also energized. As disk 72 rotates the finger 104 follows the spiral groove 105 and head 82 moves in a spiral path so that stylus 92 traces a spiral groove 154 on film 144. The depth of this groove depends on the amplitude of the output of amplifier 48 which passes current through coil 100 to project the plunger 95 axially more or less. The flexible diaphragm 86 serves as a mechanical return bias for the plunger. After the spoken message is completed switch 50 can be set to OFF position. Groove 105 will be formed with an innermost circular turn 105′ to stop inward movement of head 82 radially of disk 72.

If desired, the recorded audio message can be played back immediately. First knob 64 is pulled out to release finger 104 and restore head 82 to its radially outermost position. Then the switch 50 is set to PLAYBACK position. This connects the loudspeaker-microphone to the amplifier output and the coil 100 to the amplifier input. The motor starts to drive disk 72 and stylus 92 follows the inscribed groove 154 to reproduce the recorded message audibly. As mentioned above the stylus normally extends axially forwardly and bears lightly against film 144. The stylus responds freely to the varying depth of groove 154 due to the flexibility of diaphragm 86 to oscillate plunger 102 which induces a voltage in coil 100 for driving amplifier 48.

After playback is completed knob 64 will be pulled outwardly to disengage the stylus from film 144 and to disengage the finger 104 from groove 105. Then the head 82 returns to initial recording position and the film assembly 33 can be advanced to the next picture taking position while the knob 64 is pulled out.

Figures 13, 14, 15, 16, 17:
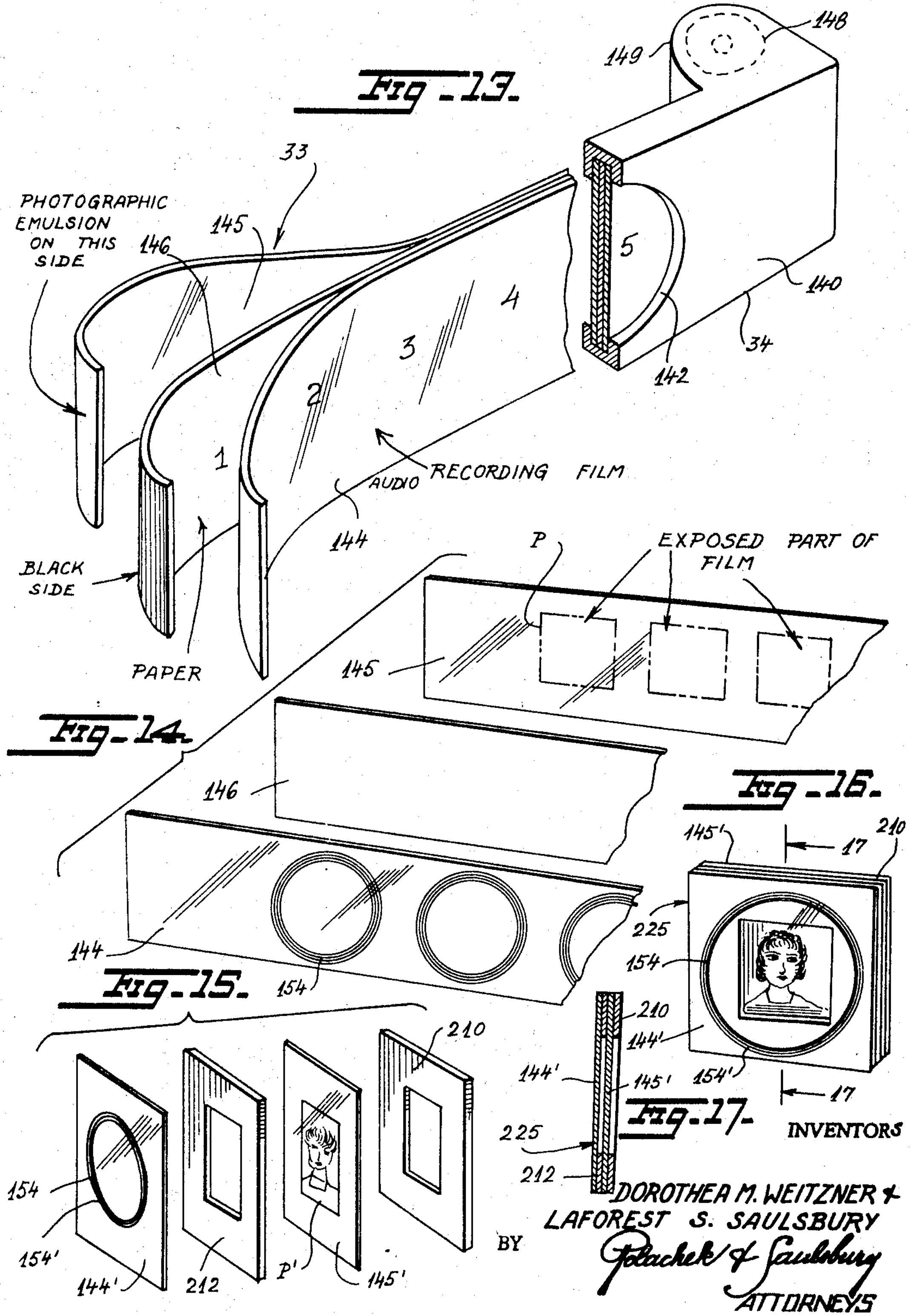
FIG. 13 is an enlarged perspective view of a film and backing assembly employed in the camera, parts being broken away.
FIG. 14 is an exploded perspective view of parts of the film assembly after photographic exposure of the film and recording of a sound message.
FIG. 15 is an exploded perspective view of parts of a slide made by use of the invention.
FIG. 16 is an oblique side view of an assembled slide made by using the parts shown in FIG. 15.
FIG. 17 is a central sectional view taken on line 17—17 of FIG. 16.

After pictures P indicated in FIG. 14 are photographically impressed on film 145, with messages inscribed in grooves 154 on film 144, the cartridge will be removed and the film assembly will be processed in conventional manner to develop the pictures. FIGS. 15–17 show the resultant product. Transparency 145' has developed picture P' thereon. A section 144' of film 144 carries a message inscribed in a spiral groove 154 occupying an annular area 154' which surrounds the picture. An apertured backing frame 210 is applied to the transparent film 145' and an apertured front frame 212 is interposed between film section 144' and film 145'. The entire assembly is cemented together to form slide 225 shown in FIGS. 16 and 17.

The picture on the slide can be projected in a projector in conventional manner. To reproduce the recorded message simultaneously the projector will be provided with a suitable sound reproducing device capable of reproducing audibly the message inscribed on film 144' while the picture P' is being projected optically.

If playback of the message on the slide is required in the camera itself, then a camera 20A such as shown in FIG. 18 can be provided. This camera is almost identical to camera 20 with casing structure 40 thereon. It has a slot 228 in the top of section 22' for receiving the slide 225. The sighting assembly 38' will be mounted on top of the camera section 22' to allow space for insertion of the slide. The sound reproduction apparatus will be the same as described above with switch 50 set to PLAYBACK position.

There has thus been provided a camera for taking pictures and also recording a sound message which will surround each picture. Further means has been provided for playback of recorded sound messages. If desired, the film 144 can be made thick enough to serve as a front facing for the transparency 145' so that the frame 212 can be omitted.

While I have illustrated and described the preferred embodiments of my invention it is to be understood that I do not limit myself to the precise constructions herein disclosed and that various changes and modifications may be made within the scope of the invention as defined in the appended claims.

What is claimed is:

1. A combination camera and sound recording device, comprising a casing having a front section for removably receiving a cartridge having a laminated film assembly therein to photographically record optical images, a casing structure having a base section located underneath said front section and a rear section located behind the front section disk rotatably mounted in said rear section, motor means in the base operatively connected with said disk to rotate the same, a sound recording head mounted on said disk and movable radially thereof while the disk rotates, said sound recording head having a stylus extending forwardly for contacting a film layer in said laminated film assembly, and means in said rear section for moving said sound recording head radially of the disk while the disk rotates so that the stylus traces a spiral path on said film layer, said head carrying a transducer responsive to changing applied electric current for axially reciprocating the stylus to trace a groove of varying depth on said film layer while the disk rotates and the head moves radially of the disk, a loudspeaker-microphone and amplifier in the base, a multiple position switch in the base having an operating knob projecting outwardly of the base, and circuit means connecting said transducer, switch loudspeaker-microphone and amplifier in either of two circuit configurations at two of the switch positions respectively, said loudspeaker-microphone being connected to the amplifier input and the transducer being connected to the amplifier output in one switch position and circuit configuration for recording a sound message in said groove on the film layer, said loudspeaker-microphone being connected to the amplifier output and the transducer being connected to the amplifier input in a second switch position and configuration for picking up and audibly reproducing a sound message recorded in said groove on said film layer.

2. A combination camera and sound recording device as recited in claim 1, further comprising a power supply source in said base, said circuit means further interconnecting said motor, amplifier and switch for energizing the motor and amplifier in each of said two switch positions.

3. A combination camera and sound recording device, comprising a casing having a front section for removably receiving a cartridge having a laminated film assembly therein to photographically record optical images, a casing structure having a base section located underneath said front section and a rear section located behind the front section disk rotatably mounted in said rear section, motor means in the base operatively connected with said disk to rotate the same, a sound recording head mounted on said disk and movable radially thereof while the disk rotates, said sound recording head having a stylus extending forwardly for contacting a film layer in said laminated film assembly, and means in said rear section for moving said sound recording head radially of the disk while the disk rotates so that the stylus traces a spiral path on said film layer, the means for moving the sound recording head comprising a stationary plate spaced rearwardly of and parallel to said disk, said plate having a deep spiral other groove inscribed thereon, and a finger carried by said sound recording head and extending rearwardly therefrom and engaging in the deep spiral groove in said plate, whereby the head follows the deep spiral groove in the plate and the stylus traces a spiral groove on said film layer while the disk rotates.

4. A combination camera and sound recording device as recited in claim 3, further comprising spring biased means tending to urge the disk and plate together to hold said finger engaged in the deep groove in the plate, shaft means connected to the disk and plate for retracting the disk away from said film layer to disengage the stylus from the groove in the film layer, and for retracting the plate from the disk to disengage said finger from said groove in the plate, and spring means bearing on said head and urging the same radially outward of the disk to restore it to an initial outer position when the finger is disengaged from the groove in the plate.

5. A combination camera and sound recording device as recited in claim 4, wherein said head carries a transducer responsive to changing applied electric currents for axially reciprocating the stylus to trace a groove of varying depth on said film layer while the disk rotates and the head moves radially of the disk.

6. A combination camera and sound recording device as recited in claim 5 further comprising a loudspeaker-microphone and amplifier in the base, a multiple position switch in the base having an operating knob projecting outwardly of the base, and circuit means connecting said transducer, switch loudspeaker-microphone and amplifier in either of two circuit configurations at two of the switch positions respectively, said loudspeaker-microphone being connected to the amplifier input and the transducer being connected to the amplifier output in one switch position and circuit configuration for recording a sound message in said groove on the film layer, said loudspeaker-microphone being connected to the amplifier output and the transducer being connected to the amplifier input in a second switch position and configuration for picking up and audibly reproducing a sound message recorded in said groove on said film layer.

7. A combination camera and sound recording device as recited in claim 6, further comprising a power supply source in said base, said circuit means further interconnecting said motor, amplifier and switch for energizing the motor and amplifier in each of said two switch positions.

8. A combination camera and sound recording device, comprising a casing having a front section for removably receiving a cartridge having a laminated film assembly therein to photographically record optical images, a casing structure having a base section located underneath said front section and a rear section located behind the front section disk rotatably mounted in said rear section, motor means in the base operatively connected with said disk to rotate the same, a sound recording head mounted on said disk and movable radially thereof while the disk rotates, said sound recording head having a stylus extending forwardly for contacting a film layer in said laminated film assembly, and means in said rear section for moving said sound recording head radially of the disk while the disk rotates so that the stylus traces a spiral path on said film layer, a laminated film assembly in the front section, said film assembly having an emulsion coated first transparent film layer for recording optical images, thereon, a pliant, impressionable second transparent film layer for receiving impressions representing sound messages, and an opaque sheet interposed between the first and second layers.

References Cited

UNITED STATES PATENTS

| | | | |
|---|---|---|---|
| 1,974,709 | 9/1934 | Freund | 352—32 |
| 2,166,147 | 7/1939 | Heinisch | 352—34 |
| 2,521,150 | 9/1950 | Chemel | 352—34 |
| 3,081,678 | 3/1963 | Steineck | 95—12 |

JOHN M. HORAN, *Primary Examiner.*

U.S. Cl. X.R.

352—32